United States Patent
Peon et al.

(10) Patent No.: US 7,027,499 B2
(45) Date of Patent: Apr. 11, 2006

(54) DETECTION AND CORRECTION CIRCUIT FOR BLIND EQUALIZATION CONVERGENCE ERRORS

(75) Inventors: Rogelio Peon, Gijon (ES); Pablo Vila, Madrid (ES); Ander Royo, Madrid (ES)

(73) Assignee: Agere Systems Inc., Allentown, PA (US)

( * ) Notice: Subject to any disclaimer, the term of this patent is extended or adjusted under 35 U.S.C. 154(b) by 763 days.

(21) Appl. No.: 09/885,777

(22) Filed: Jun. 20, 2001

(65) Prior Publication Data

US 2002/0196873 A1    Dec. 26, 2002

(51) Int. Cl.
*H03K 5/159*    (2006.01)

(52) U.S. Cl. ..................... 375/232; 708/323

(58) Field of Classification Search ........ 375/229–236, 375/14, 18, 60, 76, 101, 341, 346, 348; 364/724.2; 333/18, 16, 166; 360/40; 307/360; 325/42, 325/65; 714/798; 708/323, 819
See application file for complete search history.

(56) References Cited

U.S. PATENT DOCUMENTS

| | | | | |
|---|---|---|---|---|
| 3,614,623 A * | 10/1971 | McAuliffe | ................. | 375/232 |
| 4,225,832 A * | 9/1980 | Faye | ........................... | 333/16 |
| 4,584,690 A * | 4/1986 | Cafiero et al. | .............. | 375/290 |
| 4,615,025 A | 9/1986 | Vry | .............................. | 370/32 |
| 4,665,531 A | 5/1987 | Aly | ............................. | 375/17 |
| 4,870,557 A * | 9/1989 | Stacey | ........................ | 375/233 |
| 4,905,254 A * | 2/1990 | Bergmans | .................. | 375/233 |
| 5,023,950 A | 6/1991 | Tsushima et al. | ........... | 455/619 |
| 5,105,440 A * | 4/1992 | Huellwegen | ................. | 375/232 |
| 5,228,058 A * | 7/1993 | Ushirokawa et al. | ........ | 375/232 |
| 5,274,490 A | 12/1993 | Tsushima et al. | ........... | 359/191 |
| 5,490,169 A * | 2/1996 | Blackwell et al. | .......... | 375/232 |
| 5,511,092 A * | 4/1996 | Cathers et al. | .............. | 375/232 |
| 5,612,956 A | 3/1997 | Walker et al. | ............... | 370/545 |
| 5,642,391 A | 6/1997 | Ewell et al. | .................. | 377/39 |
| 5,748,722 A | 5/1998 | Lee | ............................. | 379/160 |
| 5,901,175 A * | 5/1999 | Limberg | ...................... | 375/232 |
| 6,271,696 B1 * | 8/2001 | Kobayashi | ................... | 327/164 |
| 6,370,191 B1 * | 4/2002 | Mahant-Shetti et al. | .... | 375/233 |
| 6,522,707 B1 * | 2/2003 | Brandstetter et al. | ....... | 375/350 |
| 6,570,916 B1 * | 5/2003 | Feldbaumer et al. | ........ | 375/232 |

FOREIGN PATENT DOCUMENTS

JP    2000196684 A    7/2000

OTHER PUBLICATIONS

Barbosa, L.M.J.; Mota, J.C.M.; Cavalcanti, F.R.P.; A family of predictive constant modulus algorithms for blind equalization; AS-SPCC. The IEEE 2000, Oct. 1-4, 2000; pp.: 260-265.*

\* cited by examiner

*Primary Examiner*—Temesghen Ghebretinsae
*Assistant Examiner*—Jacob Meek

(57) ABSTRACT

An apparatus processes an equalizer output signal. The equalizer output signal is formed by transmitting an alternate mark inversion input signal over a channel and passing the transmitted signal through an adaptive equalizer. The apparatus includes a correlator circuit block that detects an incorrect convergence of the adaptive equalizer and outputs a correlator output signal. A corrector filter receives the equalizer output signal and the correlator output signal, and applies a correction to the equalizer output signal based on the correlator output signal, to form a corrected signal that is substantially a time delayed copy of the input signal.

16 Claims, 3 Drawing Sheets

DETECTION AND CORRECTION CIRCUIT FOR BLIND EQUALIZATION CONVERGENCE ERRORS

FIELD OF THE INVENTION

The present invention relates generally to signal processing and more particularly to blind adaptive equalization methods and apparatus.

BACKGROUND OF THE INVENTION

Alternate Mark Inversion (AMI) line code is extensively used in many digital transmission systems using metallic interfaces such us T1/E1 and SONET/SDH. For those systems received signal equalization becomes important when the transmission channel introduces large amounts of intersymbol interference. Channel characteristics, such as cable type or length, are unknown in many applications, and adaptive equalization techniques must be used to compensate for the channel transfer function.

As explained in the ANSI recommendation T1.403-1995, the AMI transmission line code makes use of one symbol to transmit one single bit of information. Three different symbols are defined for AMI sources: positive pulses, negative pulses and absence of pulse. Binary zeros are transmitted as a zero (absence of pulse), and each binary one is transmitted as a single pulse. Pulses polarity must be alternated between consecutive pulses. Thus, there is always a negative pulse between two positive pulses and vice versa. The three possible AMI symbols can be summarized by the alphabet S.

$$S=\{A, 0, -A\} \quad (1)$$

where A is the amplitude of the transmitted pulses.

FIG. 1 shows a conventional channel and equalizer system 10. Let a[n] be a discrete-time AMI signal whose symbols take value from alphabet S. Signal a[n] is passed through a linear channel 20 with impulse response c[n]. The received signal x[n] is then filtered by a Finite Impulse Response (FIR) equalizer 30 with coefficients w[k], where k takes values from 0 to N−1, N being the filter length. The equalizer 30 outputs an equalizer output signal y[n].

Due to the absence of a training signal in systems like T1/E1 and SONET/SDH, and due to the memory of the AMI code (i.e.: correlated source), most adaptive techniques like that shown in FIG. 1 fail when trying to update the coefficients w[k] of equalizer 30. Source correlation introduces many wrong solutions for those adaptive techniques.

In some prior art systems, adaptive equalization techniques were not used for AMI signal equalization, due to the wrong solutions introduced by the code memory. In other systems, no mechanism was used for wrong convergence detection, and the equalizer was allowed to converge to the wrong solution.

A method and apparatus for handling convergence to incorrect solutions is desired.

SUMMARY OF THE INVENTION

The present invention is an apparatus for processing an equalizer output signal formed by transmitting an alternate mark inversion input signal over a channel and passing the transmitted signal through an adaptive equalizer. The apparatus comprises a correlator circuit block that detects an incorrect convergence of the adaptive equalizer and outputs a correlator output signal; and a corrector filter that receives the equalizer output signal and the correlator output signal. The corrector filter applies a correction to the equalizer output signal based on the correlator output signal, to form a corrected signal that is substantially a time delayed copy of the input signal.

DETAILED DESCRIPTION

The present invention is a method and apparatus for detecting and correcting incorrect convergence of blind adaptive equalization techniques when applied to the equalization of AMI signals.

Figure 1:
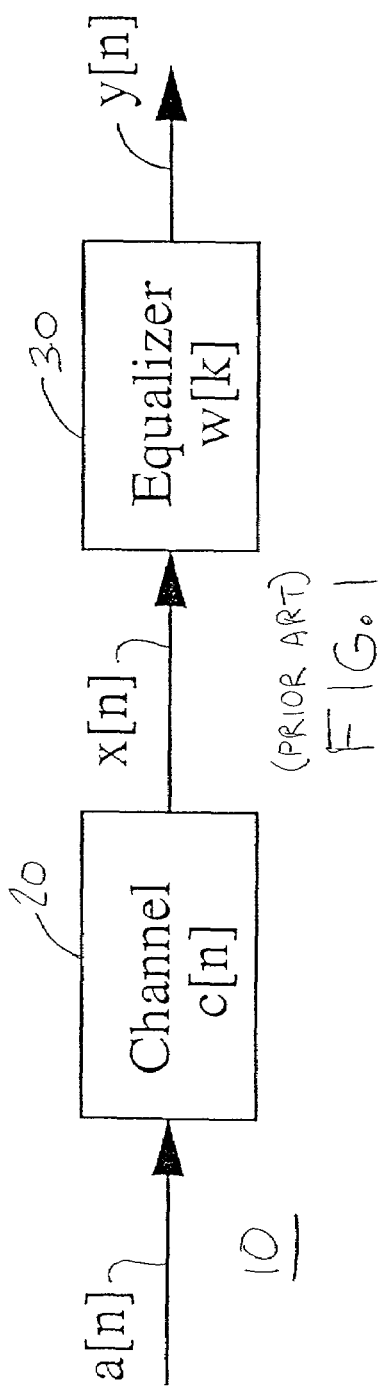
FIG. 1 is a block diagram showing a conventional channel and equalizer configuration.
Figure 2:
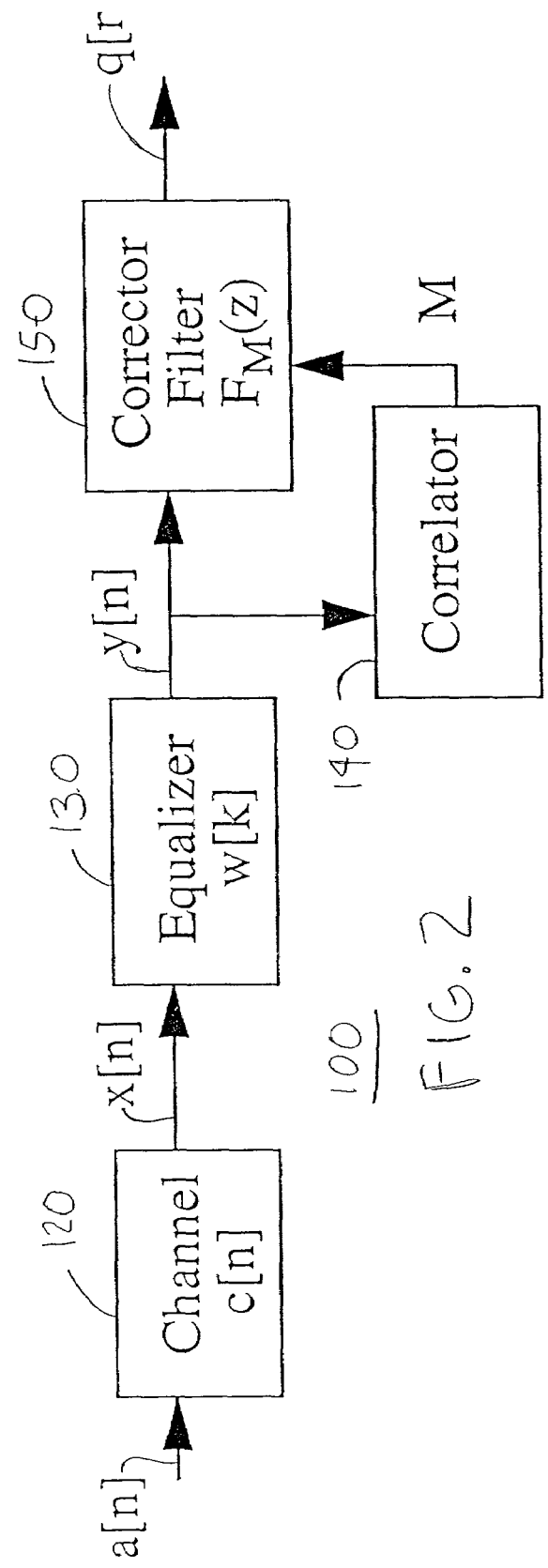
FIG. 2 is a block diagram of an exemplary apparatus according to the present invention, including a detection and correction system for incorrect convergence.

FIG. 2 is a block diagram of an exemplary apparatus 100 according to the invention. Apparatus 100 processes an equalizer output signal y[n] formed by transmitting an AMI input signal a[n] over a channel 120 and passing the transmitted signal x[n] through an adaptive equalizer 130. In the exemplary apparatus 100, two additional blocks are added, which are not present in the system 10 of FIG. 1. These two blocks include a detection (correlator) circuit block 140 and a corrector (filter) block 150. The correlator block 140 detects an incorrect convergence of the adaptive equalizer 130 and outputs a correlator output signal M. The corrector filter 150 receives the equalizer output signal y[n] and the correlator output signal M, and applies a correction $F_M(z)$ to the equalizer output signal based on the correlator output signal, to form a corrected signal q[n] that is substantially a time delayed copy of the input signal a[n].

The detection process is performed in the correlator block 140 based on the equalized signal autocorrelation function. All wrong solutions introduced by the AMI code memory affect the signal autocorrelation function in different but known ways.

The correction process is performed by the filter 150 based on the detection by the correlator block 140 of convergence to a wrong solution.

Let a[n] be a discrete-time AMI signal whose symbols take value from alphabet S. Signal a[n] is passed through a linear channel 120 with impulse response c[n]. The received signal x[n] is then filtered by a Finite Impulse Response (FIR) equalizer 130 with coefficients w[k], where k takes values from 0 to N−1, N being the filter length. For a perfect equalization case, the equalized signal y[n] should be equal to a[n−Δ], where Δ represents the total delay due to the channel 120 and equalizer 130.

Calling h[n] the convolution of the channel impulse response c[n] and the equalizer impulse response w[n], any perfect equalization solution leads to a solution h[n]=δ[n−Δ], where δ[m] is equal to one for m=0 and zero otherwise.

$$h[n] = \sum_{m=-\infty}^{\infty} a[n]c[m-n] \quad (2)$$

Since the impulse response c[n] of channel 120 is not known, the coefficients w[k] of filter 130 must be adapted to compensate for the channel transfer function. In most cases no training signal known by both the transmitter and the receiver and used to adapt the equalizer is available, so blind equalization techniques are used. Several blind equalization algorithms may be used to adapt the filter coefficients in order to reach a perfect equalization solution (Decision-directed LMS, CMA, Sato, and the like). Each method defines a cost function to be minimized. Correct performance shows absolute cost function minima for all perfect equalization solutions.

Wrong convergence of any blind equalization algorithm can be detected in correlator 140 for AMI signals equalization. This incorrect convergence is caused by an AMI code property. This property states that the summation of any set of consecutive AMI symbols is always equal to a symbol within the AMI alphabet.

$$\sum_{k=m}^{n} a[k] \in S \quad \forall n > m \tag{3}$$

Any solution h[n] equal to zero except for M consecutive ones or minus ones makes the output signal y[n] assume a value from the signal alphabet S. Therefore all blind equalization techniques show cost function absolute minima for those wrong solutions. When converging to one of those incorrect solutions the adaptation process is stopped although perfect equalization has not been reached. Hence the convergence to those wrong solutions must be detected and properly corrected in order to restore the transmitted signal.

Let $L_M$ be the family of solutions h[n] equal to zero for all n except for M consecutive ones or minus ones. For example, the following string shows M consecutive ones.

$$h[n] = \ldots 0\underbrace{1 \ldots 1}_{M \text{ ones}} 0 \ldots \in L_M \tag{4}$$

These solutions are absolute minima for any blind equalization algorithm cost function, but do not correspond to a perfect equalization solution. Convergence to any solution included in $L_M$ can be detected by means of the output signal y[n] autocorrelation function $\phi[n]$. For any solution h[n] included in $L_M$, the autocorrelation function $\phi[n]$ is given by equation (5):

$$\phi[n] = \frac{A^2}{4} \cdot (2\delta[n] - \delta[n+M] - \delta[n-M]) \tag{5}$$

From that autocorrelation function the value of M can be detected in case of wrong convergence. The output signal y[n] is then filtered to correct the wrong convergence effects. This is achieved by passing the output signal y[n] through a block having the transfer function $F_M(z)$ to provide a corrected signal q[n].

Calling $H_M(z)$ the transfer function of any solution h[n] included in $L_M$, the inverse function $F_M(z)$ is given by equation (6):

$$F_M(z) = \frac{1}{H_M(z)} = \frac{1-z^{-1}}{1-z^{-M}} \tag{6}$$

In the time domain, the corrected output signal q[n] is given by equation (7):

$$q[n] = y[n] - y[n-1] + q[n-M] \tag{7}$$

The transmitted signal can then be restored at the output of the corrector filter.

The present invention performs two different tasks:
Detects the convergence to a wrong solution introduced by the AMI source correlation; and
Corrects the overall channel-equalizer transfer function by filtering the output signal The invention may be embodied in apparatus having main two blocks, a correlator (detector) 140 and an IIR filter (corrector) 150. The implementation of the autocorrelation function of the output signal may include a detector block 140 implementing the autocorrelation function of the equalizer output signal y[n].

The first function is performed by the correlator block 140, which estimates the autocorrelation function of the equalizer output signal y[n] and detects the value of M, based on equation (8):

$$R[m] = \sum_{i=0}^{S} y[i] y[i-m] \tag{8}$$

where S is the number of iterations used for R[m] calculation.

R[m] is calculated for m from 1 to L. L is the maximum expected value for M, and can be set equal to the maximum expected length for the channel impulse response c[n]. L registers accumulate the value of R[m] for the S iterations. The circuitry compares the values of R[m] (m=1 . . . L) and selects the maximum absolute value. The output value M is equal to the number m of the R value for which R[m] has the maximum absolute value.

Figure 3:
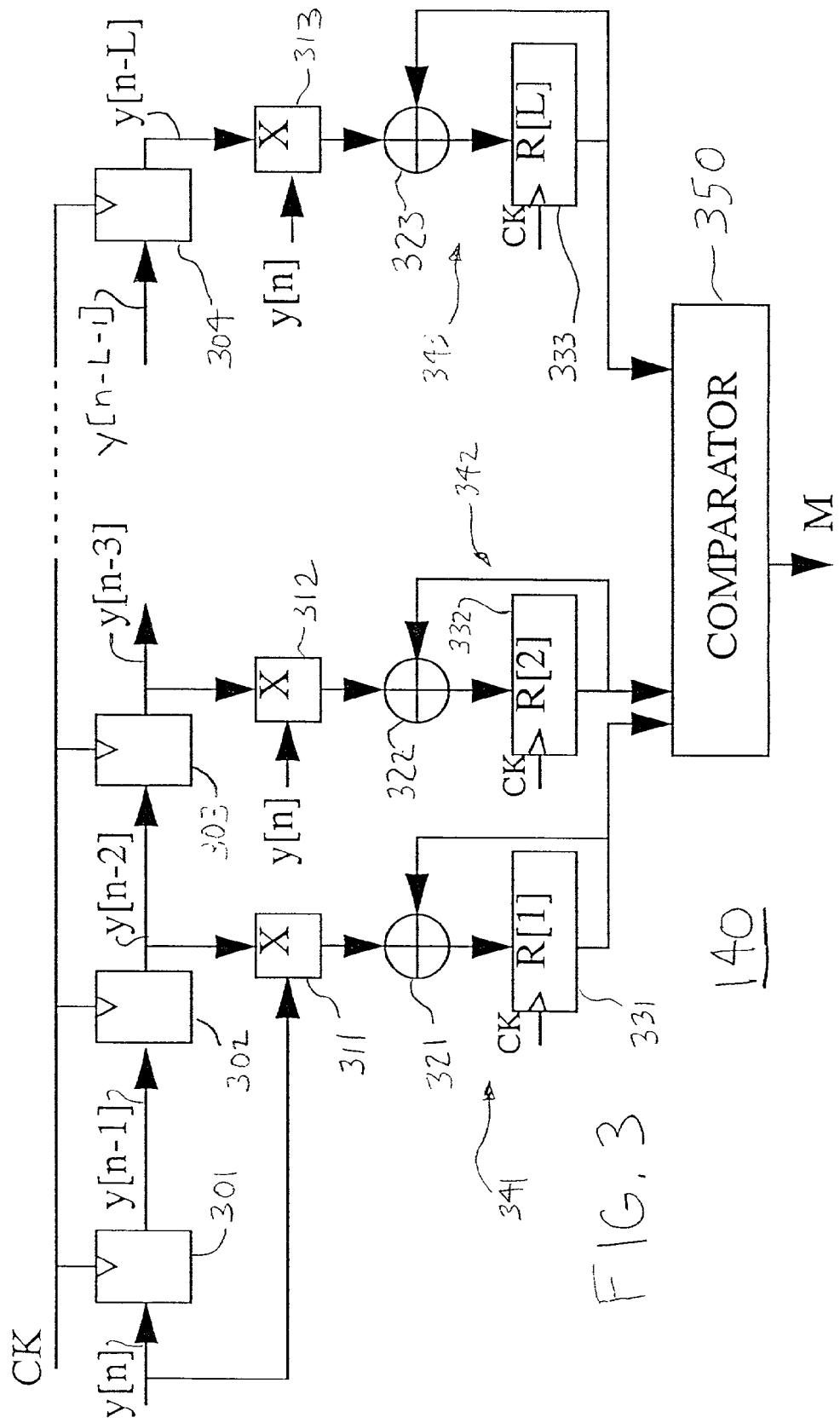
FIG. 3 is a detailed block diagram of the exemplary correlator block shown in FIG. 2.

FIG. 3 shows an exemplary implementation of the detection (correlator) block 140, where CK is the clock signal indicating the sampling rate. The correlator block 140 performs the calculations of equation (8), for calculating an estimate of an autocorrelation function of the equalizer output signal. A delay line may be used at the output of the equalizer where all the past signal samples are multiplied by the current equalizer output. Correlator block 140 determines the value of m for which R[m] has the maximum absolute value. This value of m is output as M.

In the exemplary correlator block, a L latch devices 301–304 each delay the equalizer output signal y[m] by an additional cycle. The exemplary latch devices 301–304 are D-type flip-flops, but other types of latch devices known to those of ordinary skill may be substituted. L-1 multipliers 311–313 are provided. Each multiplier 311–313 multiplies the equalizer output signal y[n] by a respective delayed equalizer signal 302–304.

A plurality of accumulators 341–343 are provided. Each of the exemplary accumulators 341–343 includes a respective adder 321–323 and a respective flip-flop 331–333. Each accumulator accumulates values of a respective product signal from multipliers 311–313 to form a respective sum, R[1], R[2], . . . R[L]. Other types of accumulator circuits may be substituted.

The values of R[m] are provided to a block 350 labeled "comparator" in FIG. 3. The comparator block 350 identifies the value of m for which R has a minimum value when calculated by the autocorrelation function calculating means of FIG. 3. Comparator block 350 outputs this value of m (for which R has a maximum absolute valute) in the output signal M.

One circuit that could implement this function would be a "comparator in tree": this comparator is composed of several stages of basic modules, the function of which is to compare two inputs and to return the bigger of the two inputs. The inputs of the first stage of this comparator are the signals to be compared. The inputs of the other stages are the outputs of the previous stage. With this method, every stage has half the number of modules of the previous stage, and all the comparisons can be made with $\text{Log}_2(N)$ stages, where N is the number of signals to be compared, and the number of basic comparator s would be equal to N−1.

When the blind equalization algorithm does not converge to a wrong solution introduced by the source correlation, the maximum absolute value is found for R[1] (M=1), and no corrective action is taken. For wrong convergence, M has a value greater than one, indicating the family of functions $L_M$ where the algorithm has converged, and corrective actions are taken.

The operation of the corrector filter block 150 is now described. The corrective actions may be performed by an IIR filter with a transfer function given by equation (9):

$$F(z) = \frac{1 - z^{-1}}{1 - z^{-M}} \quad (9)$$

where M is the number given by the correlation block 140.

The time domain version of equation (9) is provided in equation (10):

$$q[n] = y[n] - y[n-1] + q[n-M] \quad (10)$$

Figure 4:
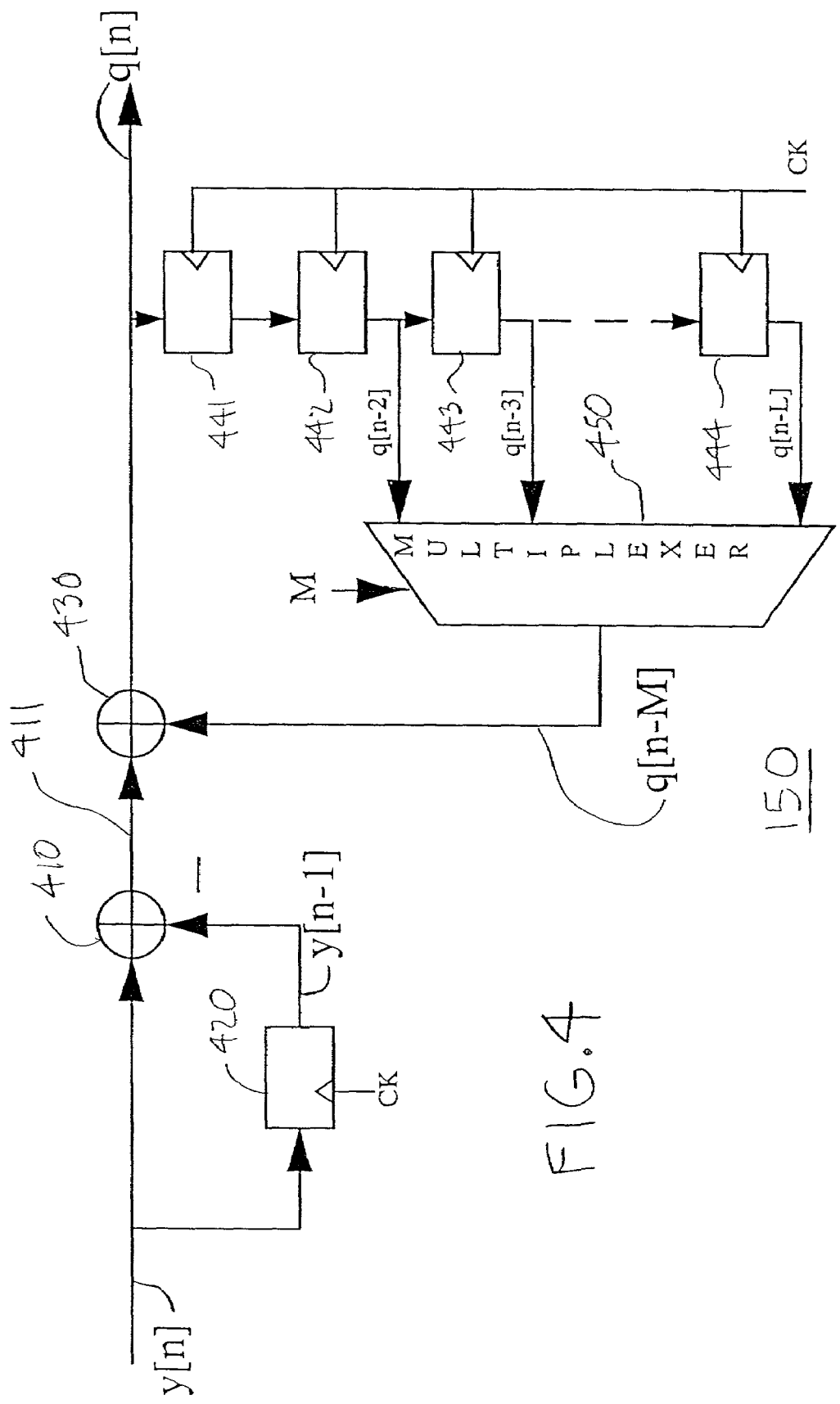
FIG. 4 is a detailed block diagram of the exemplary corrector filter shown in FIG. 2.

FIG. 4 shows an exemplary IIR (Infinite Impulse Response) filter structure of corrector filter 150. Corrector filter 150 implements equation (10). The equalizer output signal y[n] is delayed by one cycle in latch 420 (which may be a D-type flip-flop or other known latch). The delayed signal y[n−1] is subtracted from the equalizer output signal y[n] in a subtractor 410 to form a difference signal 411. The difference signal 411 is added to a delayed corrected signal q[n−M] in adder 430, to form the corrected signal q[n]. The corrected signal q[n] is delayed by a series of latches 441–444 (which may be D-type flip-flops or other known latches). Each latch 442–444 outputs the corrected signal q[n−2], q[n−3], . . . , q[n−L] with an additional delay of one cycle. The delayed corrected signals q[n−2], q[n−3], . . . , q[n−L] are provided to a multiplexer 450. The multiplexer 450 uses the signal M from the correlator block 140 as a select input signal, to select one of the delayed corrected signals labeled q[n−M].

Note that for M=1 the filter transfer function is equal to one, so no filtering action is taken. In that case, the corrector filter is bypassed.

One advantage of the invention is that it allows the use of blind equalization techniques for AMI signal equalization by detecting and correcting the wrong convergence of those techniques. The simplicity and robustness of this invention makes it advantageous for VLSI implementation on real equalizers.

Although a hardware embodiment of the invention is described herein, one of ordinary skill in the art can readily develop a computer software program to perform the computations of equations (8) and (10), for the correlator block 140 and corrector filter 150.

Although the invention has been described in terms of exemplary embodiments, it is not limited thereto. Rather, the appended claim should be construed broadly, to include other variants and embodiments of the invention, which may be made by those skilled in the art without departing from the scope and range of equivalents of the invention.

What is claimed is:

1. Apparatus for processing an equalizer output signal formed by transmitting an alternate mark inversion input signal over a channel and passing the transmitted signal through an adaptive equalizer, comprising:

a correlator circuit block, with means for calculating an estimate of an autocorrelation function of the equalizer output signal, that detects an incorrect convergence of the adaptive equalizer and outputs a correlator output signal; and a corrector filter that receives the equalizer output signal and the correlator output signal, and applies a correction to the equalizer output signal based on the correlator output signal, to form a corrected signal that is substantially a time delayed copy of the input signal wherein the autocorrelation function calculating means performs the calculation according to the equation:

$$R[m] = \sum_{i=0}^{S} y[i]y[i-m]$$

where R is the estimate of the autocorrelation function, m is an integer which varies from 1 to a maximum expected length for an impulse response function of the channel, y is the equalizer output signal, i is an index, and S is a number of iterations used for the calculation.

2. The apparatus of claim 3, wherein the corrector filter applies a correction based on a maximum value of R calculated by the autocorrelation function calculating means.

3. The apparatus of claim 1, wherein the corrector filter applies a correction based on the equation:

$$q[n] = y[n] - y[n-1] + q[n-M]$$

where n is an index, q[n] is the corrected signal, y[n] is the equalizer output signal, and M is the value of m for which R has a maximum absolute value when calculated by the autocorrelation function calculating means.

4. Apparatus for processing an equalizer output signal formed by transmitting an alternate mark inversion input signal over a channel and passing the transmitted signal through an adaptive equalizer, comprising:

a correlator circuit block that detects an incorrect convergence of the adaptive equalizer by summing a plurality of consecutive alternate mark inversion symbols and outputs a correlator output signal;

a corrector filter that receives the equalizer output signal and the correlator output signal, and applies a correction to the equalizer output signal based on the correlator output signal, to form a corrected signal that is substantially a time delayed copy of the input signal, and means for calculating an estimate of an autocorrelation function of the equalizer output signal, wherein the autocorrelation function calculating means comprises:

a plurality of latches for providing a plurality of delayed equalizer output signals;

a plurality of multipliers, each multiplier multiplying the equalizer output signal with a respective one of the delayed equalizer output signals to form a product signal;

a plurality of accumulators, each accumulating values of a respective product signal to form a respective sum; and means for identifying which of the accumulators contains a maximum one of the sums.

5. The apparatus of claim 4, wherein the plurality of latches are D-type flip-flops.

6. The apparatus of claim 4, wherein at least one of the accumulators is a register.

7. Apparatus for processing an equalizer output signal formed by transmitting an alternate mark inversion input signal over a channel and passing the transmitted signal through an adaptive equalizer, comprising;

a correlator circuit block that detects an incorrect convergence of the adaptive equalizer by summing a plurality of consecutive alternate mark inversion symbols and outputs a correlator output signal;

a corrector filter tat receives the equalizer output signal and the correlator output signal, and applies a correction to the equalizer output signal based on the correlator output signal, to form a corrected signal that is substantially a time delayed copy of the input signal, wherein the corrector filter includes an infinite impulse response filter, and means for calculating an estimate of an autocorrelation function of the equalizer output signal.

8. The apparatus of claim 7, wherein the corrector filter includes:

a first latch for delaying the equalizer output signal and outputting a delayed signal;

an subtractor for subtracting the delayed signal from the equalizer output signal and providing a difference signal;

a plurality of additional latches, each delaying the corrected signal by a respectively different number of clock cycles, each additional latch outputting a respective delayed corrected signal;

a multiplexer that selects one of the delayed corrected signals; and an adder that adds the difference signal and the selected delayed corrected signal, to form the corrected signal.

9. The apparatus of claim 8, wherein the first latch or one or more of the additional latches is a D-type flip-flop.

10. The apparatus of claim 8, wherein the correlator output signal is provided to a select input of the multiplexer to select one of the delayed corrected signals.

11. A method for processing an equalizer output signal formed by transmitting an alternate mark inversion (AMI) input signal over a channel and passing the transmitted signal through a blind adaptive equalizer, the method comprising the steps of:

detecting an incorrect convergence of the blind adaptive equalizer, based on the equalizer output signal;

applying a correction to the equalizer output signal, to form a corrected signal that is substantially a time delayed copy of the AMI input signal; and estimating an autocorrelation function of the equalizer output signal; wherein the correction is based on the estimated autocorrelation function of the equalizer output signal wherein the step of estimating the autocorrelation function includes performing a calculation according to the equation:

$$R[m] = \sum_{i=0}^{S} y[i]y[i-m]$$

where R is the estimate of the autocorrelation function, m is an integer which varies from 1 to a maximum expected length for an impulse response function of the channel, y is the equalizer output signal, i is an index, and S is a number of iterations used for the calculation.

12. The method of claim 11, wherein the correction is based on the maximum calculated value of R.

13. The method of claim 11, wherein the correction is based on the equation:

$$q[n]=y[n]-y[n-1]+q[n-M]$$

where n is an index, q[n] is the corrected signal, y[n] is the equalizer output signal, and M is the value of m for which R has a maximum absolute value when calculated by the autocorrelation function calculating means.

14. A method for processing an equalizer output signal formed by transmitting an alternate mark inversion (AMI) input signal over a channel and passing the transmitted signal through a blind adaptive equalizer, the method comprising the steps of:

detecting an incorrect convergence of the blind adaptive equalizer, based on summing a plurality of consecutive alternate mark inversion symbols at the equalizer output signal;

applying a correction to the equalizer output signal, to form a corrected signal that is substantially a time delayed copy of the AMI input signal; and estimating an autocorrelation function of the equalizer output signal; wherein the correction is based on the estimated autocorrelation function of the equalizer output signal, wherein the autocorrelation function calculating step includes:

providing a plurality of delayed equalizer output signals;

multiplying the equalizer output signal with respective ones of the delayed equalizer output signals to form respective product signals;

accumulating values of each respective product signal to form a respective sum; and identifying a maximum one of the sums.

15. A method for processing an equalizer output signal formed by transmitting an alternate mark inversion (AMI) input signal over a channel and passing the transmitted signal through a blind adaptive equalizer, the method comprising the steps of:

detecting an incorrect convergence of the blind adaptive equalizer, based on summing a plurality of consecutive alternate mark inversion symbols at the equalizer output signal; and applying a correction to the equalizer output signal, to form a corrected signal that is substantially a time delayed copy of the AMI input signal, wherein the correction applying step includes:

delaying the equalizer output signal and outputting a delayed signal;

subtracting the delayed signal from the equalizer output signal and providing a difference signal;

delaying the corrected signal by a plurality of respectively different numbers of clock cycles, and outputting a respective delayed corrected signals;

selecting one of the delayed corrected signals; and adding the difference signal and the selected delayed corrected signal, to form the corrected signal.

16. The method of claim 15, further comprising the step of estimating an autocorrelation function of the equalizer output signal, wherein the step of selecting said one of the delayed corrected signals includes selecting said signal based on the estimate of the autocorrelation function.

* * * * *